US010343879B1

(12) United States Patent
Felps et al.

(10) Patent No.: US 10,343,879 B1
(45) Date of Patent: Jul. 9, 2019

(54) THREE SPEED ELECTRONIC WINCH CONTACTOR

(71) Applicants: Jimmie Doyle Felps, Colorado Springs, CO (US); Scott Charles Heupel, Maple Grove, MN (US)

(72) Inventors: Jimmie Doyle Felps, Colorado Springs, CO (US); Scott Charles Heupel, Maple Grove, MN (US)

(73) Assignee: MotoAlliance, Excelsior, MN (US)

( * ) Notice: Subject to any disclaimer, the term of this patent is extended or adjusted under 35 U.S.C. 154(b) by 0 days.

(21) Appl. No.: 15/863,273

(22) Filed: Jan. 5, 2018

(51) Int. Cl.
*H02P 7/00* (2016.01)
*B66D 1/48* (2006.01)
*B66D 1/12* (2006.01)
*H02P 7/292* (2016.01)
*H02P 7/29* (2016.01)
*H02P 7/03* (2016.01)

(52) U.S. Cl.
CPC .............. *B66D 1/485* (2013.01); *B66D 1/12* (2013.01); *H02P 7/04* (2016.02); *H02P 7/29* (2013.01); *H02P 7/292* (2013.01)

(58) Field of Classification Search
USPC ..... 318/400.21, 400.22, 782, 783, 163, 445, 318/10
See application file for complete search history.

(56) References Cited

U.S. PATENT DOCUMENTS

| 4,161,126 | A | | 7/1979 | Winzeler | |
|---|---|---|---|---|---|
| 4,255,789 | A | * | 3/1981 | Hartford | F02D 41/263 123/406.65 |
| 4,453,430 | A | | 6/1984 | Sell | |
| 5,350,992 | A | * | 9/1994 | Colter | H02M 7/48 318/805 |
| 5,927,691 | A | | 7/1999 | Ottemann | |
| 7,782,036 | B1 | * | 8/2010 | Wong | H02M 3/156 323/282 |
| 8,958,956 | B1 | | 2/2015 | Felps | |
| 2005/0029976 | A1 | * | 2/2005 | Terry | F04B 35/04 318/400.21 |
| 2010/0127644 | A1 | * | 5/2010 | Fregoso | B60L 15/2009 318/16 |
| 2013/0151825 | A1 | * | 6/2013 | Huynh | H02M 1/08 713/1 |
| 2017/0300107 | A1 | * | 10/2017 | Green | G06F 1/3287 |

* cited by examiner

*Primary Examiner* — Jorge L Carrasquillo
(74) *Attorney, Agent, or Firm* — The Neudeck Law Firm, LLC

(57) ABSTRACT

A winch control system having a solid state winch contactor and a boost power supply for a vehicle equipped with an electric winch and especially for off-road vehicles, is disclosed. This invention automatically provides three winch speeds: a "slow start" ("creep") speed for "parking" the hook and for "sneaking" up on a load, a normal speed for normal winch operation and a fast speed for taking less time to unwind and rewind the winch rope when there is no load on the winch. Protection features for the winch contactor and/or the winch include, but are not limited to, electronic winch motor braking, current limiting, over temperature, undervoltage and reverse battery. Winch current limiting is adjustable from 100 amps to 300 amps, chosen for the purpose of accommodating various winch sizes.

3 Claims, 4 Drawing Sheets

THREE SPEED ELECTRONIC WINCH CONTACTOR

FIELD OF THE INVENTION

The present invention relates generally to motor vehicle electrical systems, and more specifically, to a winch control system that incorporates an electronic winch contactor and a boost power supply to provide three different speeds for driving the electric winch.

BACKGROUND OF THE INVENTION

Electric winches have long been used, especially on utility type, off-road vehicles, for various pulling and lifting tasks. The first shortcoming of prior art has been the personal danger and possibility of winch damage when trying to "park" the winch hook and the inability to "sneak" up on a load. A second shortcoming is the length of time it takes to unwind and rewind the winch rope when there is no load. A third shortcoming is the risk of tangling the winch rope when winching a vehicle that is stuck and suddenly gets traction, causing sudden slack in the winch rope. A fourth shortcoming is the lack of adequate protection features and reliability for the winch motor and/or the electro-mechanical relay control module (i.e. contactor) that powers the winch motor and also reverses the direction of the winch drum. This invention overcomes the first shortcoming by employing a "slow start" mode (or "creep" mode) which automatically switches to a normal winch speed after a short period of time. The second shortcoming is overcome by detecting when the winch is unloaded and after a pre-determined period of time automatically switching to a faster rope speed (boost mode). The third shortcoming is overcome by the fast speed that minimizes the risk of getting a loose rope. The fourth shortcoming is minimized by the many features employed in this invention which include over-current-protection, current-range-adjustment, over-temperature-protection, various protection modes for the external drive, metal oxide semiconductor field effect transistors (MOS-FETs), low-battery-protection and reverse-battery-protection.

Prior art to offer multiple winch speeds has been done by changing gear ratios (in the winch gear box) by U.S. Pat. No. 5,927,691 (Otteman), U.S. Pat. No. 4,453,430 (Sell) and U.S. Pat. No. 4,161,126 (Winzeler). Changing gear ratios has a disadvantage because it increases the winch torque by the same ratio as the gear ratio increase, resulting in an increased risk of personal injury and/or winch system damage. One with ordinary skill in the art will readily recognize how gearing affects winch load rating as demonstrated when using a "snatch block" where the winch rope is doubled between the load and the winch. This will cut the retrieval speed in half but also doubles the winch power (e.g. you get approximately 10,000 pounds of pull from a 5,000 pound winch).

Another method to offer multiple winch speeds is by using multiple stator windings with different numbers of poles in an alternating current (AC) motor as used in a shop winch in U.S. Pat. No. 4,145,645 (Price, et al.). This approach is a result of recognizing the benefits of having multiple winch speeds, especially a "creep" mode, but is not automatic and is not practical for a vehicle winch because AC voltage is not typically available. Trolling motors used for fishing have multiple speeds to allow a fisherman to change the speed of the boat. An early method of accomplishing this was to have up to five discrete speeds by using multiple windings and resistors in the winch motor which were selected by switches. More recent trolling motors use pulse-width-modulation (PWM) to power the motor. PWM is the use of a rectangular waveform where battery power is applied to the trolling motor for a period of time and then removed for the balance of the waveform cycle. The duty cycle of this PWM waveform is varied to achieve different motor speeds. Prior art trolling motor speed control is practical but complex, expensive and more difficult to accomplish at the high currents (up to 300 amps and more) required to drive a winch motor.

Yet another prior art that has been used to increase the speed of direct current (DC) motor is to simply apply a higher DC voltage to the motor winding. Such was a common practice in converting antique tractors or other antique vehicles from 6 volt electrical systems to 12 volt electrical systems. The 6 volt starter motor was seldom rewound for 12 volts. It would simply run faster on 12 volts because of the higher torque (since the torque of a DC motor is directly proportional to the motor's armature current), and consequently, make it easier to start the vehicle's engine. This approach is used in the present invention and automatically controlled.

One prior art, U.S. Pat. No. 8,958,956 (Felps) uses electronic control (i.e. solid state) for driving a vehicle winch but has only one winch speed and still uses an electro-mechanical contactor for energizing the winch and reversing the drum direction.

SUMMARY OF THE INVENTION

In a preferred embodiment of the present invention, when the winch is activated via an IN or OUT signal, a low duty cycle pulse-width-modulated (PWM) waveform powers the winch motor for 650 milliseconds to provide a "slow start" mode before switching to a continuous 12 volt mode for normal operation. If the IN/OUT switch is cycled before the low duty cycle PWM waveform ends, slow start will repeat. If IN or OUT is initiated and if no load has been detected on the winch for 1.5 seconds, the winch motor drive voltage of 12 volts is boosted to 24 volts to increase the winch drum speed. When the winch is running in the fast speed mode and a load is suddenly detected on the winch, the boost power supply is immediately turned off.

By using a 20% duty cycle, 9.5 kHz drive waveform to produce slow start, the winch torque is reduced from what it is during the normal speed because the winch motor's armature current is decreased. In practice (i.e. using this slow start drive on a MotoAlliance 12 volt Viper Elite 5000 pound electric winch on its outer layer of winch rope), the armature current for slow start is typically 6.76 times lower than normal speed, resulting in a typical reduction of winch load rating from 5000 pounds to 740 pounds. Not only does this greatly reduce risk of personal injury or damage to the winch system, but also makes it easy to stall the winch when parking the hook or sneaking up on a load, and resulting in no undue stress on the winch rope. On the outer layer of the winch rope, typical winch rope speeds observed was 0.85 inches per second for slow speed, 6.6 inches per second for normal speed and 10.5 inches per second for fast speed.

If desired, the present invention can also be used without the boost feature, eliminating the need for the boost power supply. Eliminating the boost feature also allows the winch contactor to be used with 24 volt vehicle electrical systems.

The motor driver integrated circuit (IC), DRV8701 E, used to drive the winch motor provides electronic braking by shorting the winch motor winding as soon as IN or OUT is terminated. Protection features in the winch contactor protect it, and indirectly, protect the winch against over-current and over-temperature. Reverse battery protection prevents damage to the solid state winch contactor in the event the battery connections are reversed.

BRIEF DESCRIPTION OF THE DRAWINGS

The drawings presented in the present disclosure provide a better understanding of the present invention, but are not intended to limit the scope or use of the invention. The components in the drawings do not necessarily adhere to conventional symbols, emphasis being placed upon clearly illustrating the principles of the present invention. Some components such as capacitors and transient voltage surge protectors used for filtering and/or voltage surge protection are not shown since they are not pertinent to understanding the operation of the invention. Moreover, in the drawings, a tilde character (~), indicates a "not true" polarity of a logic signal. Like reference numerals designate corresponding parts throughout the several views and in which.

DETAILED DESCRIPTION OF THE INVENTION

The present disclosure describes how this preferred embodiment of the present invention operates, but is not intended to limit the scope, other applications or uses of the present invention. The present disclosure is primarily for off-road vehicles, but is not limited to these vehicles, nor limited in its chosen signal timings for various features or limited in its chosen output current or voltage capabilities. All logic circuit timings and duty cycle percentages, circuit voltages and temperatures are approximate.

Figure 1:
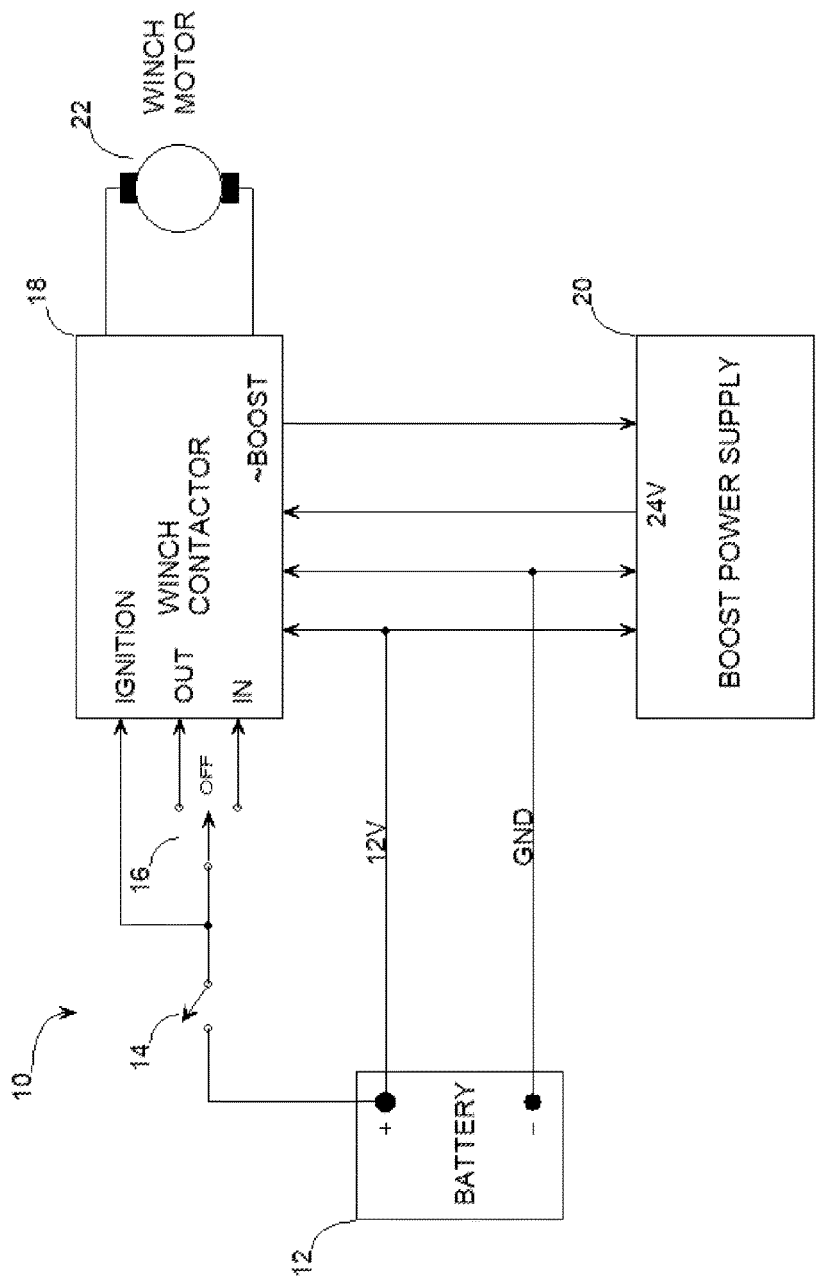
FIG. 1 is a simplified schematic of a typical vehicle electrical system equipped with an electric winch that is being driven by a preferred embodiment of the present invention comprising a solid state winch contactor and a boost power supply.

To begin, refer to FIG. 1, a block diagram for the portion of a vehicle's electrical system required when a winch control system using the present invention has been added. Battery 12 is the vehicle battery which is typically a flooded, lead-acid battery; switch 14 is part of the vehicle's ignition switch and is wired to enable winch operation only when the ignition switch is on; switch 16 is a winch control switch with a center off position and momentary positions for IN and OUT; winch contactor 18 is a solid state winch controller that provides functions necessary to drive and protect winch motor 22; and when winch motor 22 is unloaded, boost power supply 20 boosts winch contactor 18 motor voltage from 12 volts to a regulated 24 volts for driving winch motor 22 at a faster speed.

In the present invention an output current of 40 amps was chosen for boost power supply 20 which is sufficient for many unloaded, winch motors 22, especially those having load ratings up to 5000 or 6000 pounds. Lower output currents as well as higher output currents for boost power supply 20 may apply to other winch motor 22 sizes and/or brands. Winch contactor 18 and boost power supply 20 should be waterproof units to withstand the elements of nature.

Figure 2A:
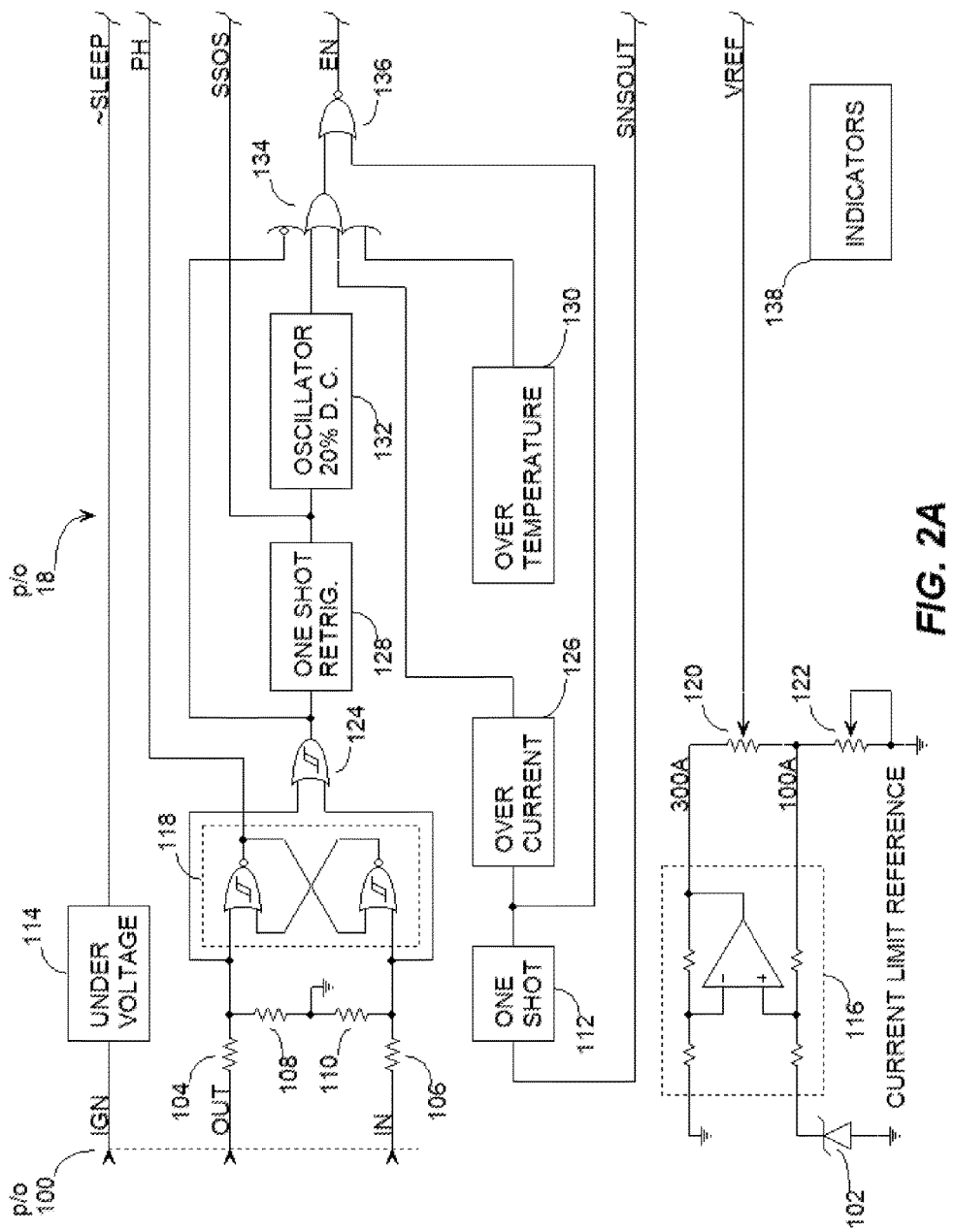
FIG. 2A is a schematic of the driver control for winch contactor 18 in FIG. 1 (100 series numbering)
Figure 2B:
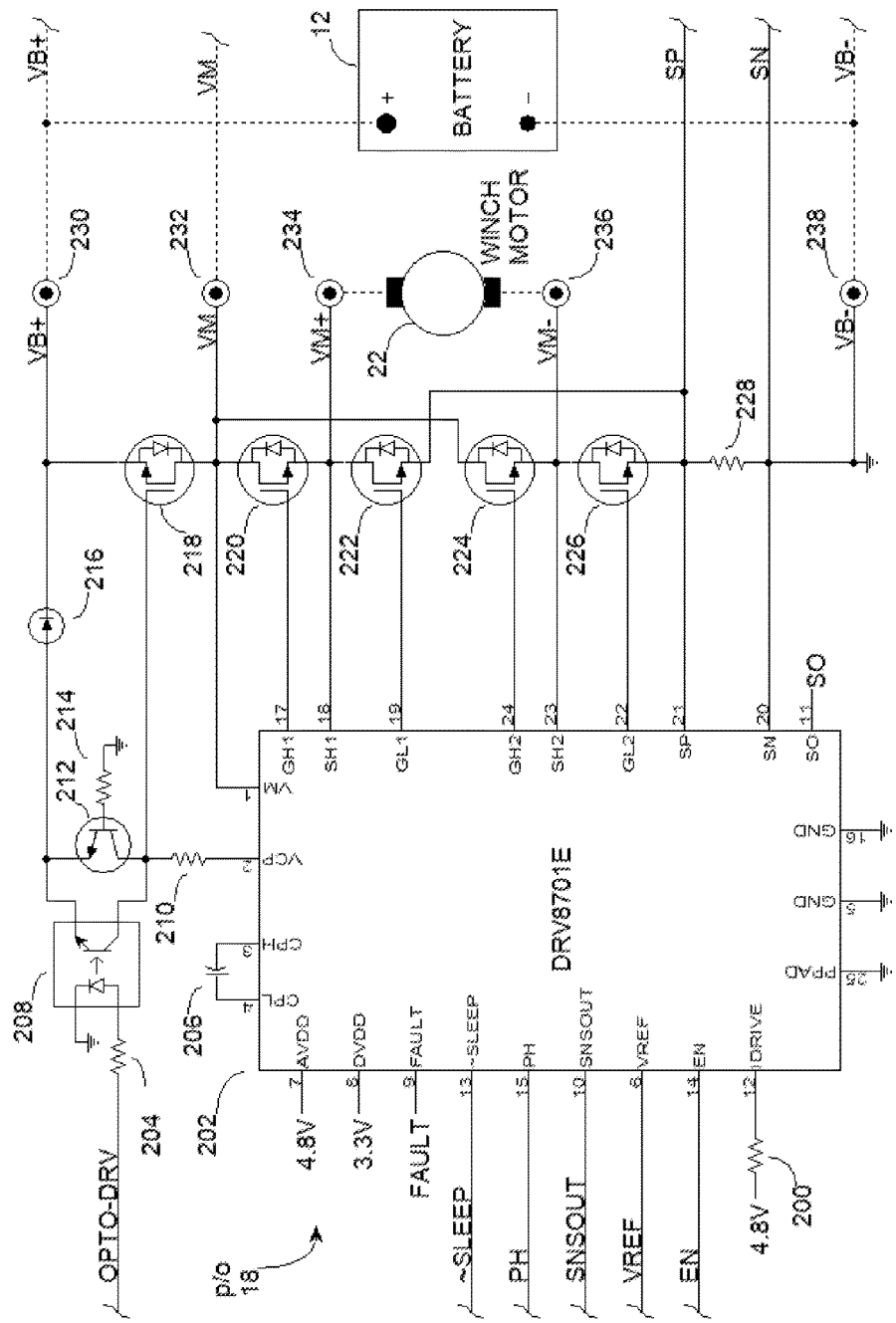
FIG. 2B is a schematic of the motor driver for winch contactor 18 in FIG. 1 (200 series numbering) being simplified by showing MOSFETs 218-226 and resistor 228 as single devices when in fact they are multiple devices in parallel.
Figure 2C:
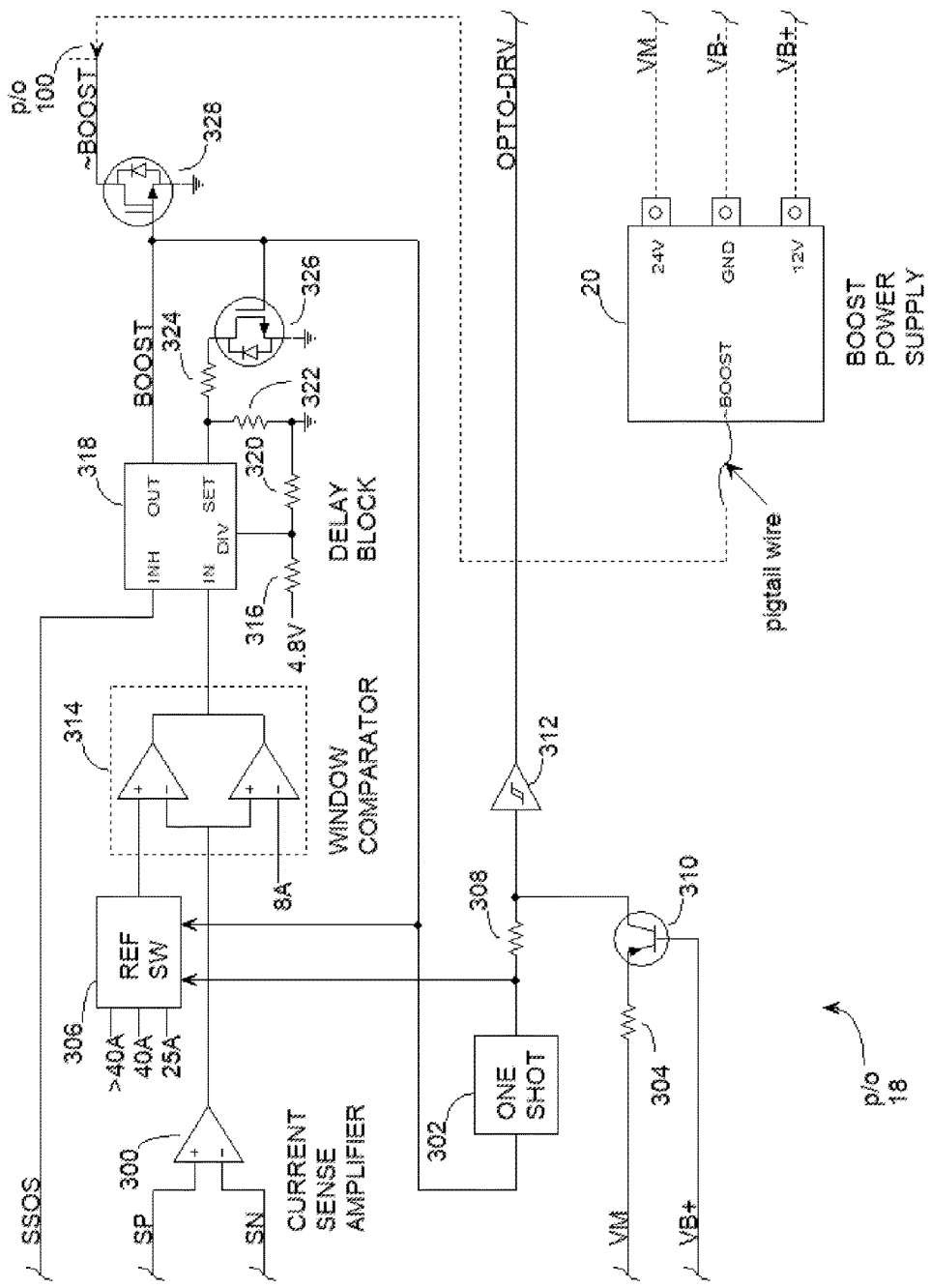
FIG. 2C is a schematic of the boost control for winch contactor 18 in FIG. 1 (300 series numbering).

Referring to FIGS. 2A, 2B and 2C, driver control, motor driver and boost control, respectively, these three schematics combine to perform the functions of winch contactor 18. Part of connector 100 in FIG. 2A (three terminals) provides the interface for IGN (ignition), IN and OUT signals from switches 14 and 16 in FIG. 1. The other part of connector 100 in FIG. 2C (one terminal) provides an output, BOOST, to activate boost power supply 20 in FIG. 2C.

Referring to FIG. 2A (driver control), under voltage 114 activates integrated circuit (IC) DRV8701 E 202 in FIG. 2B via the SLEEP signal and lights the ON light-emitting-diode (LED) (green) in indicators 138, provided battery 12 voltage in FIGS. 1 and 2B is above 8 volts. If the voltage is below 8 volts or switch 14 in FIG. 1 is off, no LEDs will be lit in indicators 138. Resistors 108 and 110 are pull-down resistors for when IN or OUT is not selected. Resistors 104 and 106 limit the current into latch 118 and OR gate 124. Latch 118 selects the phase, PH, of the drive to winch motor 22 in FIG. 2B through IC DRV8701 E 202 in FIG. 2B. OR gate 124 triggers one shot 128 when IN or OUT is selected. Latch 118 and OR gate 124 have Schmitt trigger inputs for slow rise and fall times. Latch 118 also debounces the IN and OUT signals.

One shot 128 has a pulse width of 650 milliseconds. When one shot 128 is triggered, oscillator 132 begins to oscillate at 9.5 kHz with a typical 20% duty cycle (percentage of low level time). The low oscillator frequency of 9.5 kHz was chosen because of the large, power MOSFETs 220-226 in FIG. 2B. The output of OR gate 134 (having one inverted input) has to be low to drive winch motor 22 in FIGS. 1 and 2B. If the other inputs to OR gate 134 and NOR gate 136 allow oscillator 132 to determine the enable signal, EN, the signal EN will be high for 20% of its period, generating a slow start drive for winch motor 22. When EN is high the IN/OUT LED (orange) in indicators 138 is lit, but is dim during slow start. Each time IN or OUT is selected, the complete 650 millisecond period occurs at one shot 128 even if one shot 128 has not previously timed out (i.e. retriggerable). This feature is especially useful when parking the hook because it allows an extended slow start.

SNSOUT is a signal from IC DRV8701 E 202 that occurs when an over current event occurs on winch motor 22 which results in winch motor 22 no longer being driven and the IN/OUT LED (orange) in indicators 138 is no longer lit. SNSOUT is generated as a means of current regulation for winch motor 22 referred to as "current chopping," which is a "fixed-off-time" regulation scheme with a variable time to be on and to stay on until current chopping occurs again. Again, because of large, power MOSFETs 220-226, this off time pulse needed to be increased from its 25 microseconds. So one shot 112 pulse width was chosen to be 100 microseconds. One shot 112 extends the off time of winch motor 22 through an input in NOR gate 136.

Even though IC DRV8701E 202 and one shot 112 combine to provide current regulation for winch motor 22, the rate at which current chopping occurs is a function of how much current overload exists in winch motor 22. If current chopping is occurring more frequently than every 3 milliseconds, over current 126 will shut down drive to winch motor 22 through an input of OR gate 134 for a period of 5 seconds and lights the over current LED (blue) in indicators 138. Over current shutdown can occur in less than 100 milliseconds for very high, current overloads.

Over temperature 130 senses the temperature of MOSFET 226 in FIG. 2B (which is on during an IN operation and at which time winch motor 22 can be heavily loaded) and shuts down drive to winch motor 22 when the temperature reaches 85° C. Shutdown lasts 14 seconds to allow cool down of MOSFETs 218, 220 and 226. This event lights over temperature LED (red) in indicators 138. All protection shutdown modes for winch motor 22 last sufficiently long to alert the operator that a protection feature has taken over control of winch motor 22.

Reference voltage 102 provides a 2.5 volt reference for differential amplifier 116 that has a gain of 0.2. The result is a VREF that ranges from 750 millivolts (300 amp upper current limit for winch contactor 18) at the top of potentiometer 120 and 250 millivolts (100 amp lower current limit) at the bottom, plus an offset voltage of up to 330 millivolts (130 millivolts typically) set by potentiometer 122 to compensate for output offset voltage of the current sense amplifier output signal, SO, in IC DRV8701 E 202 when IN or OUT is not activated.

Referring to FIG. 2B (motor driver), IC DRV8701 E 202 contains a charge pump to create charge pump voltage, VCP, which is typically 9.5 volts above winch motor supply voltage, VM, so N-channel, enhancement mode, MOSFETs 220 and 224 could be used. The charge pump in IC DRV8701 E 202 can deliver only enough current to support MOSFETs 220 and 224 that have a maximum total gate charge, Qg, of 200 nanocoulombs at 38 kHz. Therefore, the timing on oscillator 132 and one shot 112 in FIG. 2A was chosen to be compatible with the chosen MOSFETs 220 and 224 that have a maximum Qg of 578 nanocoulombs. And, the programming on IC DRV8701 E 202 for IDRIVE (not shown) was chosen to be the maximum rating of 150 milliamps for high-side MOSFETs 220 and 224 and 300 milliamps for low-side MOSFETs 222 and 226. Capacitor 206 is the charge pump capacitor. Charge pump voltage, VCP, is also used to provide gate bias voltage for MOSFET 218.

Many protection features are included in IC DRV8701 E 202 for MOSFETs 220-226 including excessive drain-to-source voltage (an indication of excessive drain current), undervoltage for motor supply voltage, VM, undervoltage for charge pump voltage, VCP, winch motor 22 current limiting, and delays for turning high side MOSFETs 220 and 224 on only after low side MOSFETs 222 and 226, respectively, have turned off, and vise versa. When MOSFETs 220 and 226 are on, the voltage at VM+ terminal 234 is positive and the voltage at VM− terminal 236 is negative and winch motor 22 is in the rewind mode, IN. And vise versa, when MOSFETs 224 and 222 are on, the voltage at VM+ terminal 234 is negative and the voltage at VM− terminal 236 is positive and winch motor 22 is in the unwind mode, OUT. The positive voltage, VB+, from battery 12 goes through reverse-battery-protection MOSFET 218 before supplying power to IC DRV8701E 202. If when installing battery 12 in the vehicle, the positive terminal of battery 12 is connected to VB− terminal 236 (ground) and the negative terminal of battery 12 is connected to the VB+ terminal 230, the reverse-battery-protection circuit consisting of diode 216, NPN transistor 212 and resistors 210 and 214 will turn MOSFET 218 off and not allow the voltage on VM terminal 234 to be negative with respect to VB− terminal 238 and lights a reverse-battery-protection LED (red) in indicators 138 in FIG. 2A. During this event no other LEDs in indicators 138 are lit. Boost power supply 20 in FIG. 2C must also have reverse-battery-protection to prevent damage to boost power supply 20 and possibly to winch contactor 18 in FIG. 1 via the VM terminal 232. If boost power supply 20 does not have reverse battery protection, then boost power supply 20 must be disconnected from the vehicle electrical system 10 in FIG. 1 until battery 12 is installed correctly as determined by winch contactor 18.

Resistor 204 and opto-coupler 208 can also turn MOSFET 218 off (via OPTO-DRV) to allow voltage, VM, to be boosted to 24 volts by boost power supply 20.

Resistor 228 senses current of winch motor 22 for the purpose of over-current-protection performed by IC DRV8701 E 202 and for determining (via boost control circuitry in FIG. 2C) when winch motor 22 is unloaded.

Output voltage, 4.8V, from IC DRV8701 E 202 provides power for winch contactor 18 in FIGS. 2A-2C. Output voltage, 3.3V, from IC DRV8701 E 202 is only used to power the fault LED (red) in indicators 138, the FAULT signal being an output of IC DRV8701 E 202, being low active during any of the many protection features built into IC DRV8701 E 202 and recovering automatically when the fault ceases.

Referring to FIG. 2C (boost control), current sense amplifier 300 monitors the voltage across resistor 228 in FIG. 2B (SP minus SN), and amplifies it by a factor of 500 and sends the result to window comparator 314 which determines if the result lies between the range of 8 amps and 25 amps (the current range selected before boost). The output of window comparator 314 goes to digital delay block 318 where the output, BOOST, does not go high until window comparator 314 output remains high continuously for 1.5 seconds (set by resistor 322 and two programming resistors 316 and 320 for delay block 318). Slow start one shot 128 in FIG. 2A sends signal, SSOS, to delay block 318 input, INH, which inhibits the 1.5 second timing of delay block 318 until slow start ends. When the output of delay block 318, BOOST, goes high, it goes to MOSFET 328 which generates signal, BOOST, to turn on boost power supply 20, selects the 40 A current threshold in reference switch 306 (provided it is not over-ridden by one shot 302) and triggers one shot 302.

The pulse width of one shot 302 is 550 milliseconds for the purpose of essentially disabling the upper reference current for reference switch 306 (i.e. making it >40 A to allow the start up surge current in winch motor 22) and for turning off the reverse-battery-protection MOSFET 218 in FIG. 2B via output, OPTO-DRV, through resistor 308 and buffer 312. The pulse from one shot 302 allows time for PNP transistor 310 to detect motor voltage, VM, has become 1.0 volt higher than battery voltage, VB+ in FIG. 2B, and thus allows boost to continue after one shot 302 times out. Transistor 310 also prevents MOSFET 218 from being turned on again until motor voltage, VM, drops back down to within 1.0 volt of battery voltage, VB+. This prevents MOSFET 218 from having to discharge the output capacitors in boost power supply 20 when it has a high drain-to-source voltage (up to 16 volts) on it which would likely exceed the pulse power capability of MOSFET 218.

Resistor 304 limits the current through the base of transistor 310 and into the input of buffer 312. When one shot 302 times out, the signal, BOOST, switches reference switch 306 to select the 40 amp upper reference current for window comparator 314. This higher reference current (40 A versus 25A) is for the purpose of allowing a higher winch motor 22 current that results when 24 volts is applied to winch motor 22. BOOST going high also switches in resistor 324 via MOSFET 326 to reduce the delay time to turn off delay block 318 to <300 milliseconds.

What we claim as our invention is:

1. An electronic winch control system, comprising:
a driver control comprising:
- a voltage measuring circuit to determine whether a voltage from a vehicle ignition switch is above a minimum threshold of 8 volts, the driver control to activate a winch contactor in response the voltage from the vehicle ignition switch being determined to be above the minimum threshold of 8 volts;
- a logic latch to debounce an IN signal and an OUT signal from a winch control switch;
- an OR gate coupled with the IN and OUT signals to trigger slow start circuitry and allow winch activation;
- a retriggerable one shot coupled with an oscillator to create a slow start for a winch motor by generating a drive waveform, to be coupled to the winch motor, of approximately 20% on time duty cycle and approximately 9.5 kHz frequency to drive the winch motor at the beginning of each IN cycle and each OUT cycle, the drive waveform lasting approximately 650 milliseconds before switching to a constant battery voltage;
- a one shot to increase an off time of the drive waveform from approximately 25 microseconds to approximately 100 microseconds in response to a detection of an over current event;
- an over-current protection circuit to cause the drive waveform to be off for a first extended period of time in response to over current events being detected more frequently than a selected threshold amount;
- an over-temperature protection circuit to cause the drive waveform to be off for a second extended period of time when at least two metal oxide semiconductor field effect transistor's (MOSFET's) that are to apply the drive waveform to the winch motor temperature reach an elevated temperature threshold limit of approximately 85 degrees centigrade;
- control logic circuitry coupled to the OR gate, the oscillator, the one shot, the over current protection circuit, and the over-temperature protection circuit to determine whether winch drive is enabled;
- a current limit reference circuit to provide a variable winch current limit; and
- light-emitting-diode (LED) indicators to display at least two winch contactor states;

a motor driver comprising:
- a motor driver integrated circuit to control the at least two MOSFETs that are to apply the drive waveform to the winch motor, the motor driver integrated circuit including electronic brake circuitry to cause a shorting of at east one winch motor winding at the end of each IN cycle and each OUT cycle,
- a current sense resistor to measure winch motor current, winch current measurements to be coupled to the motor driver integrated circuit the over current protection circuit, and a boost circuit; and
- a reverse battery protection circuit to turn off at least one reversed, N-channel MOSFET when a polarity of a connection to a battery voltage is reversed, the reversed N-channel MOSFET also to be turned off when the maximum voltage of the drive waveform is boosted;

the boost circuit, comprising:
- a winch current sense monitor amplifier to amplify a voltage across the current sense resistor;
- a window comparator to determine if the winch is unloaded, the window comparator to be selectively controlled to have at least three upper thresholds, a first upper threshold for when the maximum voltage of the drive waveform is not boosted, a second upper threshold for when the maximum voltage of the drive waveform is boosted, and a third upper threshold for when the drive waveform is transitioning between being not boosted to being boosted;
- a delay block, coupled to a boost MOSFET and a fast turnoff MOSFET;
- the boost MOSFET switch to be controlled by the delay block to turn on the boost power supply;
- the fast turnoff MOSFET switch and series resistor to reduce a delay time of the delay block to turn off the boost power supply when a winch load is detected;
- a transition timing one shot to control the window comparator to have the third upper threshold and to temporarily turn off the reversed N-channel MOSFET to allow the boost power supply to turn on; and
- a resistor and PNP transistor to determine whether the drive waveform applied to the winch motor has risen above the battery voltage, and to allow the maximum voltage of the drive waveform to continue to be boosted after the transition timing one shot has timed out, and to inhibit the reversed N-channel MOSFET from being turned back on;

a boost power supply to generate, from the battery voltage, a boosted maximum voltage of the drive waveform.

2. The electronic winch control system of claim 1 having a slow start period during a beginning of each IN cycle and each OUT cycle that provides lower winch motor torque and speed.

3. The electronic winch control system of claim 1 having a fast winch speed for unwinding and rewinding a winch rope when the winch motor is determined to be unloaded.

* * * * *